United States Patent [19] [11] 3,996,952
Root [45] Dec. 14, 1976

[54] CONTROL DAMPER
[75] Inventor: James R. Root, Independence, Mo.
[73] Assignee: Ruskin Manufacturing Company, Grandview, Mo.
[22] Filed: Sept. 18, 1975
[21] Appl. No.: 614,593
[52] U.S. Cl. .................................... 137/77; 49/7; 137/601; 169/42; 292/81; 292/DIG. 66
[51] Int. Cl.² .................................... F16K 17/38
[58] Field of Search ............................. 137/75–77, 137/601; 98/86, 101, 113, 121 A; 160/1; 292/81, DIG. 66; 49/7, 8, 74

[56] References Cited
UNITED STATES PATENTS

| | | | |
|---|---|---|---|
| 1,288,532 | 12/1918 | Drummond | 49/7 X |
| 1,788,556 | 1/1931 | Wood et al. | 98/86 X |
| 1,994,365 | 3/1935 | Mathews | 137/75 X |
| 3,543,440 | 12/1970 | Kurz | 49/7 |
| 3,718,081 | 2/1973 | Root | 137/601 X |

Primary Examiner—Martin P. Schwadron
Assistant Examiner—Richard Gerard
Attorney, Agent, or Firm—Fishburn, Gold & Litman

[57] ABSTRACT

A control damper is mounted in a building duct system for closing a control opening through a housing or frame and includes a linkage connected to the housing and to a vane positioned in the control opening and is operative for moving the vane between a flow permitting position and a position closing the control opening. The linkage includes a fusible portion permitting a resilient member to move the vane to the position closing the control opening in the event of temperature above the melting point of the fusible portion. Cooperating latch members are mounted on the housing and on the vane and are moved into vane holding engagement after melting of a fusible portion and movement of the vane to the position closing the control opening through the housing.

7 Claims, 10 Drawing Figures

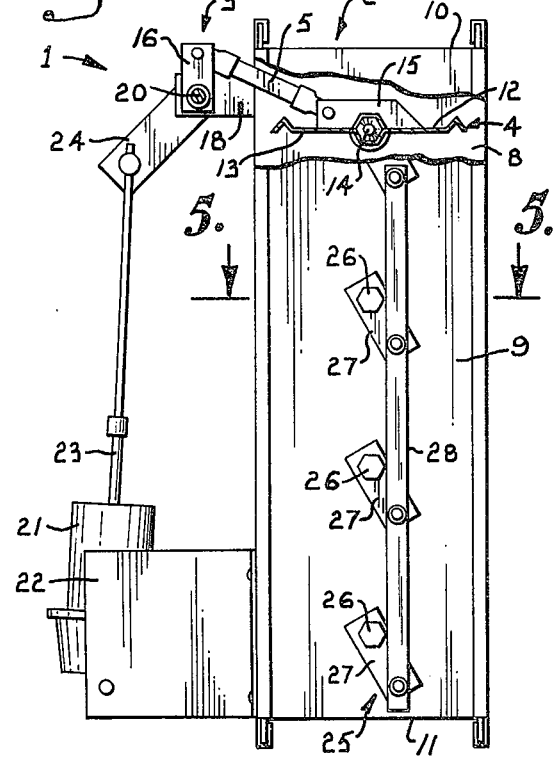
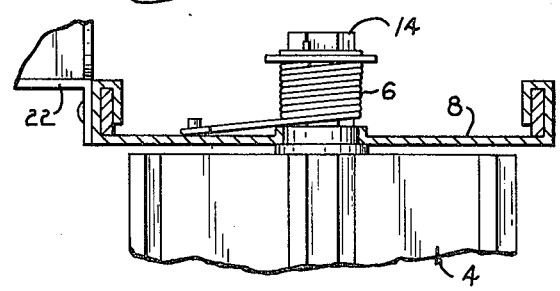
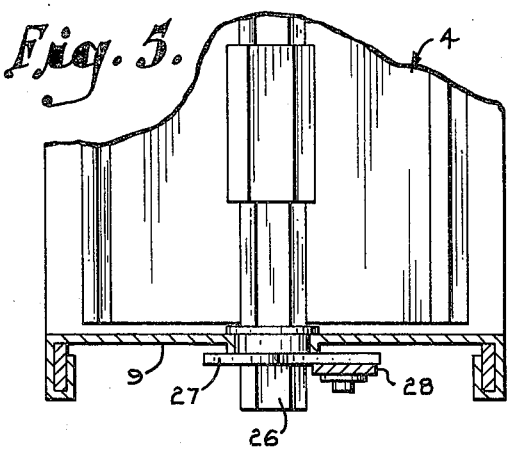
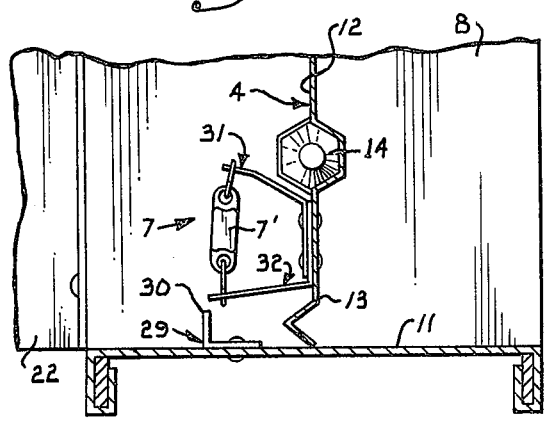
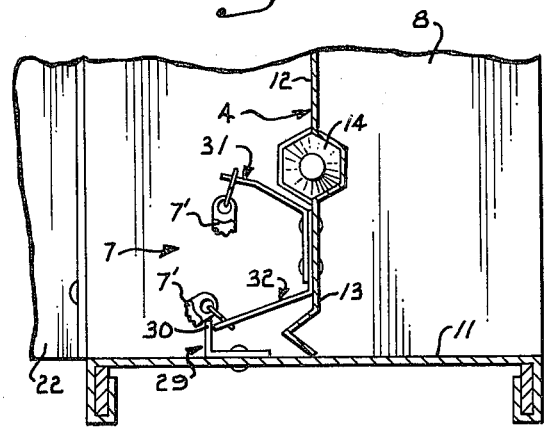

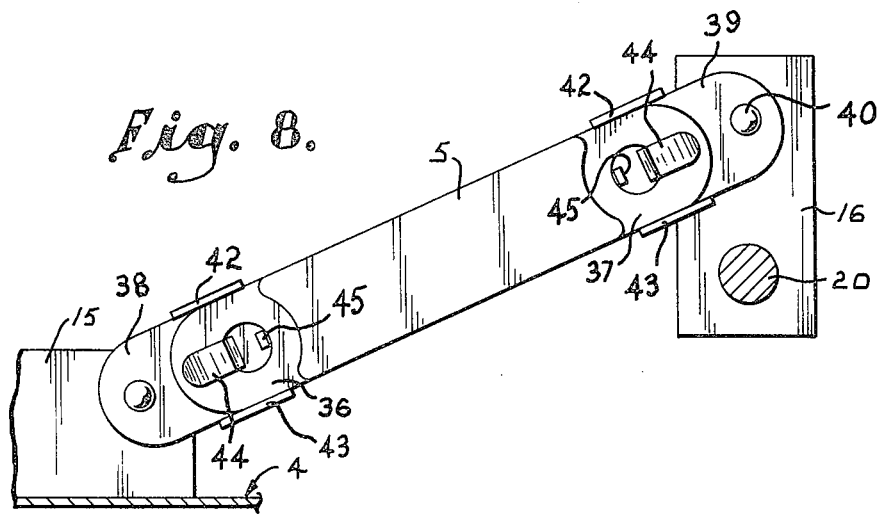
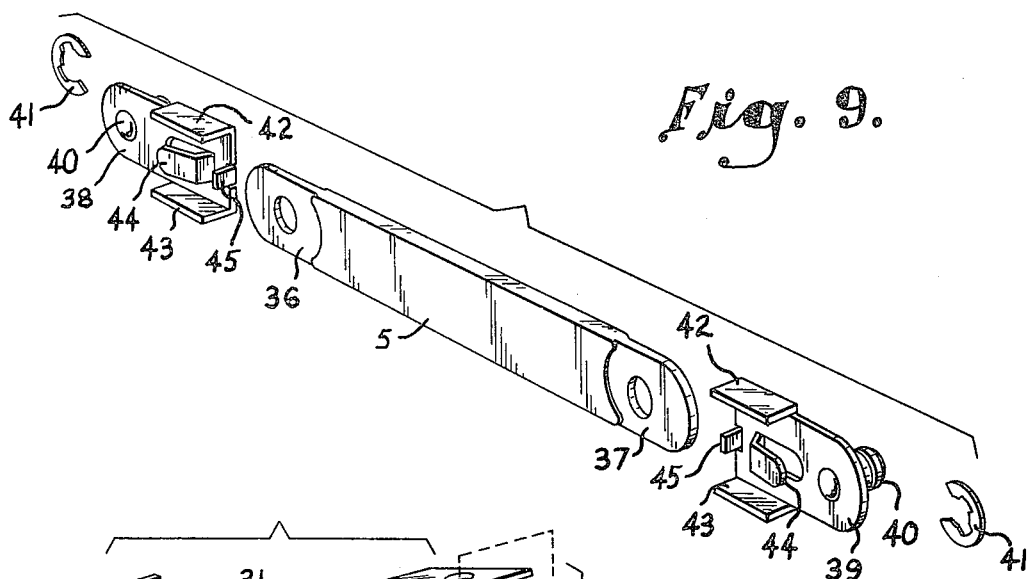
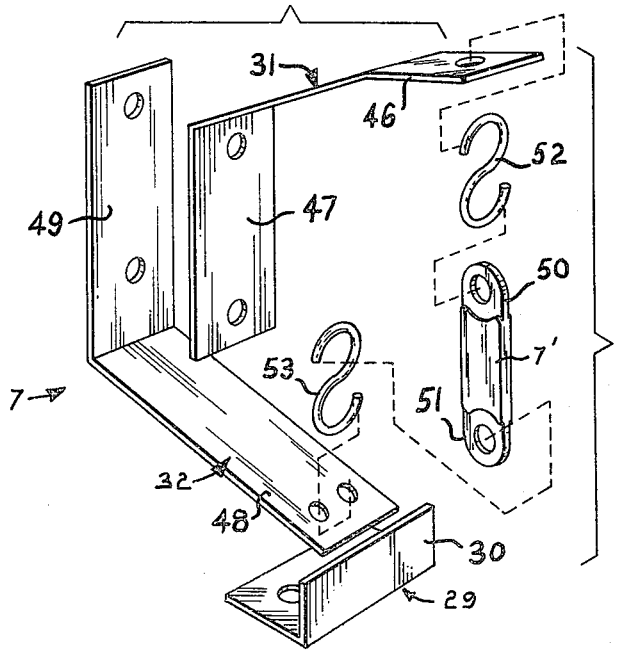

CONTROL DAMPER

The present invention relates to fluid flow control apparatus and more particularly to a control damper for controlling air flow in a duct system of a building.

The principal objects of the present invention are: to provide a control damper for mounting in a fluid conduit and which is adapted to close a control opening in the event of temperature above the melting point of fusible members in control structure thereof; to provide such a control damper having means adapted to retain vanes in a closed position when subjected to heat and then to high pressure streams of water after melting of certain fusible members; to provide such a control damper having latch members adapted to retain the vanes in a closed position with the latch members being arranged to permit normal operation until melting of certain fusible members; to provide such a control damper having a connector linkage adapted to effect uniform movement of all vanes whereby locking of one vane effects locking of all vanes; to provide such a control damper wherein fusible members are replaceable whereby the control damper may be quickly and easily returned to operable position after melting of the fusible members; to provide such a control damper including a motor operator electrically connected to a smoke detector and energized thereby to close vanes of the control damper until the smoke clears away; to provide such a control damper wherein the components thereof are all heat resistant except the fusible members; and to provide such a control damper which is economical to manufacture, durable in contruction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate varius objects and features of the control damper.

FIG. 3 is a side elevational view of the control damper showing a connector linkage for effecting simultaneous movement of the vanes.

FIG. 4 is a fragmentary sectional view taken on line 4—4 of FIG. 2 and showing resilient means for moving the vanes to a closed position upon melting of a fusible member.

FIG. 5 is a fragmentary sectional view taken on line 5—5 of FIG. 3 and showing the connector linkage for effecting simultaneous movement of the vanes.

FIG. 6 is a cross-sectional view taken on line 6—6 of FIG. 1 and showing latch members adapted to retain the vanes in a position closing the control opening.

FIG. 7 is a cross-sectional view similar to FIG. 6 except showing the latch members in a position retaining the vanes in the closed position.

FIG. 8 is an enlarged fragmentary sectional view taken on line 8—8 of FIG. 2 and showing a fusible portion of a control linkage.

FIG. 9 is an enlarged exploded perspective view of the fusible portion.

FIG. 10 is an enlarged exploded perspective view of the latch members shown in FIGS. 6 and 7.

Figure 1:
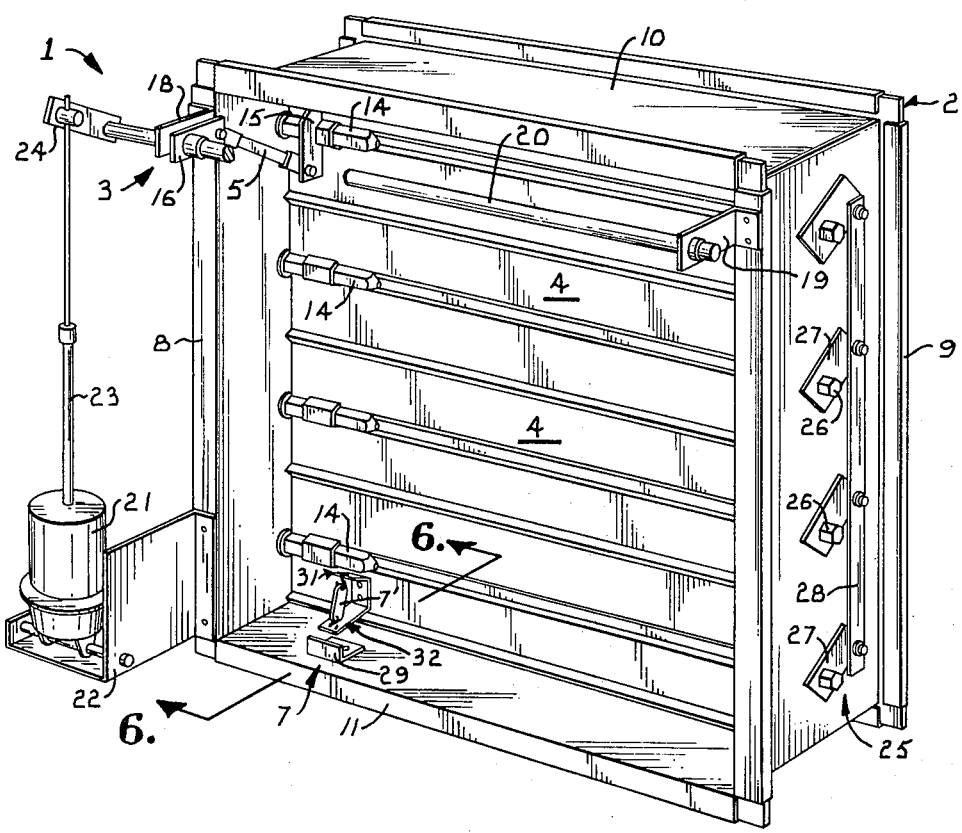
FIG. 1 is a perspective view of a control damper embodying features of the present invention.

As required, detailed embodiments of the present invention are disclosed herein, however, it is to be understood that the disclosed embodiments are merely exemplary of the invention which may be embodied in various forms. Therefore, specific structural and funtional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a control damper adapted to be mounted in a duct system of a building and operative for closing a control opening through a housing or frame 2. The control damper 1 includes a control linkage 3 connected to the housing 2 and to a vane 4 positioned in the control opening and operative for moving the vane 4 between the flow permitting position and a position closing the control opening. The control linkage 3 includes a fusible portion 5 permitting a resilient member 6 to move the vane 4 to the position closing the control opening in the event of temperature above the melting point of the fusible portion 5. Cooperating latch means 7 are mounted on the housing 2 and on the vane 4 and are moved into vane holding engagement after melting of a fusible portion 7' and movement of the vane 4 to the position closing the control opening through the housing 2.

The housing 2 comprises a damper frame defining a fluid control opening. The illustrated housing preferably is of a generally rectangular configuration and includes a pair of opposite side frame sections 8 and 9 and top and bottom frame sections 10 and 11.

Figure 2:
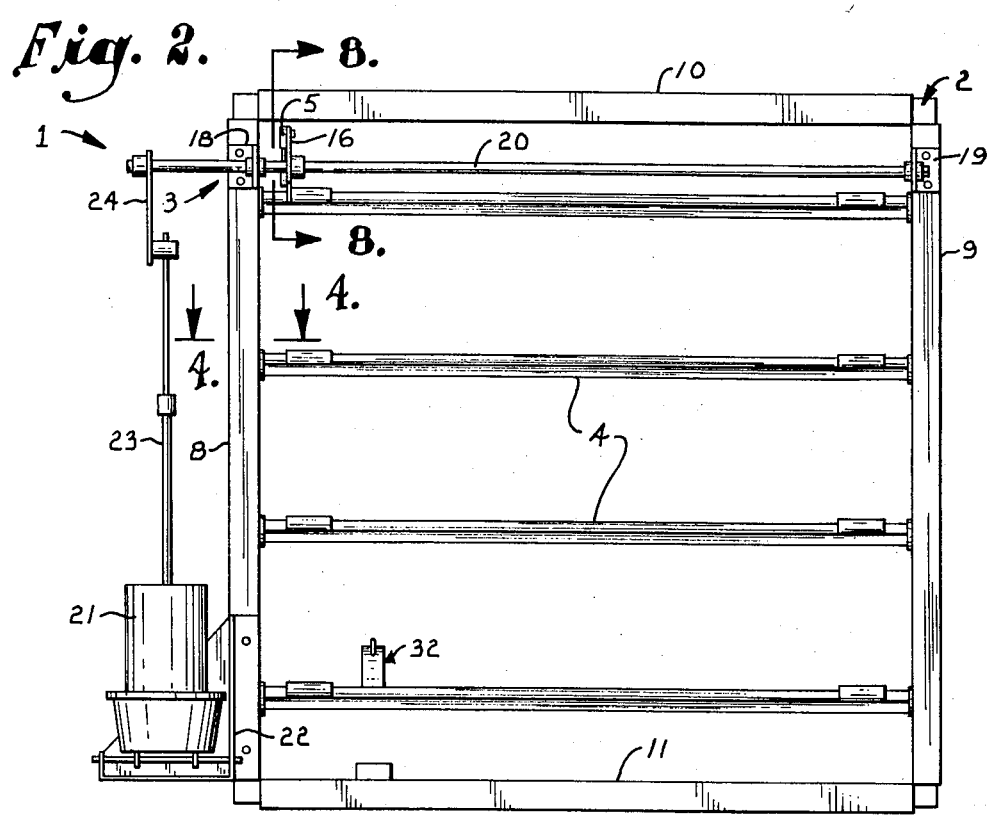
FIG. 2 is a front elevational view of the control damper and showing vanes therein in a flow permitting position.

The housing or frame 2 has at least one vane 4 and preferably a plurality of vanes movable simultaneously between a fluid flow permitting position, as best illustrated in FIGS. 2 and 3, and a position closing the control opening, as best illustrated in FIGS. 6 and 7. The vanes 4 each have opposite side portions 12 and 13 each adapted to cooperate with respective adjacent side portions of the next adjacent vane 4 when in the closed position to thereby provide a positive closure for the housing 2. The housing 2 and vanes 4 are substantially similar in construction to the housing and vanes illustrated in U.S. Pat. No. 3,718,081, issued Feb. 27, 1973, to James R. Root for CONTROL DAMPER CONSTRUCTION.

As best seen in FIG. 4, each vane has connected thereto one end of a respective resilient member 6 with the other end thereof connected to the housing or frame 2. The resilient members 6 are each operative for urging each of the respective vanes into the position closing the control opening. In the illustrated embodiment, the resilient members 6 are coil springs each having one end thereof connected to one of the side frame sections, for example, side frame section 8, and the other end thereof connected to an axle portion 14 of the respective vane 4.

The axle portions 14 each extend through the side frame section 8 and are preferably mounted in heat and corrosion resistant bearings which will remain operative at 1800° F.. An example of suitable bearings are of stainless steel which have the desired heat and corrosion resistance for long life.

The control linkage 3 includes a bracket 15 mounted on the one vane 4 and movable therewith. Means are mounted on the housing and operatively connected to the bracket 15 for selectively moving the vanes 4 and include an arm 16 having the fusible portion 5 connected thereto and extending therefrom and connected to the bracket 15 on the one vane 4. In the illustrated structure, brackets 18 and 19 are mounted on the side frame sections 8 and 9 respectively and are laterally aligned. A shaft 20 extends between and has opposite end portions thereof rotatably supported on the brackets 18 and 19. The shaft 20 has the arm 16 mounted thereon with the fusible portion 5 extending between the arm 16 and the bracket 15 on the vane 4.

The illustrated fusible portion 5 has suitable holders on each of the opposite ends thereof with the holders being pivotally connected to the bracket 15 on the upper vane 4 and to the arm 16 on the shaft 20. The fusible portion 5 has sufficient strength to transfer rotary motion of the shaft 20 to the upper vane 4 and is formed of a metal having a melting point such that melting occurs in the event of a fire in the building adjacent the control damper 1.

Any suitable means may be connected to the shaft 20 to selectively rotate same to move the vanes 4 between the flow permitting position and the position closing the control opening. In the illustrated embodiment, a reversible drive motor 21 is pivotally mounted on a suitable bracket 22 extending from the housing or frame 2 and preferably mounted on a exterior surface thereof. The drive motor 21 has a drive shaft 23 extending therefrom and pivotally connected to a second arm 24 on the shaft 20. The drive shaft 23 has threaded telescoping portions whereby extension thereof moves the vanes 4 to a position closing the control opening and retraction thereof moves the vanes 4 to the flow permitting position.

Manual means may also be connected to the shaft 20 for turning same to move the vanes 4 between the flow permitting position and the position closing the control opening. The manual means are also perferably positioned exteriorly of the control opening.

The drive motor 21 is preferably electrically connected to a suitable smoke detecting device (not shown) in an electrical circuit operative to energize the drive motor 21 to move the vanes 4 to the position closing the control opening when smoke is detected and to move the vanes 4 to the flow permitting position after the smoke clears from the smoke detecting device.

The control damper 1 includes a connected linkage 25 operative to effect uniform movement of all vanes 4, such that when one vane is moved, all vanes are moved together and when one vane is locked or latched in the closed position, all the vanes are retained in the closed position.

In the illustrated embodiment, each of the vanes 4 has a second axle portion 26 extending therefrom and outwardly through the other side frame section 9. Each second axle portion 26 is suitably rotatably supported in a heat resistant bearing. Each second axle portion 26 has an arm 27 mounted thereon and extending therefrom. A connector link 28 has each of the arms 27 pivotally connected thereto whereby movement of one of the vanes 4, for example, an upper vane having the bracket 15 thereon, effects movement of all of the vanes 4 and locking or latching of one of the vanes, for example, the lower vane 4, locks or latches all the vanes.

The latch means 7 is operative to retain the lower vane 4 in the position closing the control opening. The connector linkage 25 and the latch means 7 are operative to retain all the vanes 4 in the position closing the control opening after melting of the fusible portion 5 in the control linkage 3. In the illustrated embodiment, a stop member 29 is mounted on the bottom frame section 11 adjacent the lower vane 4 and is illustrated as an angle having an upstanding leg 30 spaced from the lower vane 4 when in position closing the control opening. A first holder member 31 is mounted on and extends outwardly from one of the side portions, for example, side portion 12, of the lower vane 4 and is positioned adjacent the axle portion 14 thereof. A second holder member 32 is mounted on and extends outwardly from the side portion 12 of the lower vane 4 and is spaced from the first holder member 31. The second holder member 32 is formed of resilient metal, such as spring steel, and is retained in a position to clear the upstanding leg 30 of the stop member 29 during movement of the lower vane 4.

A fusible link 7' extends between the first and second holder members 31 and 32 and has opposite ends thereof connected to the first and second holder members by suitable hooks. The fusible link 7' has sufficient tensile strength to retain the second holder member 32 in position to clear the upstanding leg 30 until melting of the fusible link 7' permits the second holder member 32 to move into retaining engagement with the stop member 29.

It is preferably that the fusible link 7' have a slightly higher melting point than that of the fusible portion 5 whereby the second holder member 32 of the latch means does not operate to hold the vanes 4 closed until the resilient members 6 have moved the vanes 4 to the closed position after melting of the fusible portion 5.

FIGS. 8 and 9 illustrate the fusible portion 5 and means for mounting same in the control linkage 3. The fusible portion 5 is illustrated as an elongated bar having a respective aperture in each of the opposite end portions 36 and 37 thereof. Mounting clips 38 and 39 removably receive the opposite end portions 36 and 37 respectively of the fusible portion 5.

The mounting clips 38 and 39 are pivotally connected to the bracket 15 on the upper vane 4 and to the arm 16 on the shaft 20 respectively. The mounting clips 38 and 39 each have a suitable pivot pin 40 and a removable spring lock washer 41 for retaining same in the mounted position.

Each of the mounting clips 38 and 39 has a pair of laterally spaced ears 42 and 43 extending therefrom for engaging the respective end portion of the fusible portion 5 and restricting relative movement between the fusible portion 5 and the mounting clips 38 and 39. A holder tab 44 and a spacing finger 45 extend from each of the mounting clips 38 and 39 and are received in the aperture in the respective end portion of the fusible portion 5. The holder tab 44 is positioned to permit the fusible portion 5 to snap into the mounting clips.

FIG. 10 illustrates the components of the latch means 7. The illustrated first holder member 31 has an outwardly extending arm 46 and a mounting arm 47 for connection to the lower vane 4. The illustrated second holder member 32 has an outwardly extending arm 48 and a mounting arm 49 for connection to the lower vane 4 with the mounting arm 47 of the first holder member 31 in overlying relation therewith.

The fusible link 7' of the latch means 7 is illustrated as an elongated bar having a respective aperture in each of the opposite end portions 50 and 51 thereof. A first S-hook 52 extends between the outwardly extending arm 46 and the upper end portion 50 of the fusible link 7' and has opposite hook ends thereof received in respective apertures in the first holder member arm 46 and the fusible link end portion 50. A second S-hook 53 extends between the outwardly extending arm 48 and the lower end portion 51 of the fusible link 7' and has opposite hook ends thereof received in respective apertures in the second holder member arm 48 and the fusible link end portion 51.

It is to be understood that while I have illustrated and described one form of my invention, it is not to be limited to the specific form or arrangement of parts herein described and shown.

I claim:

1. A control damper for a fluid conduit, said control damper comprising:
    a. a housing defining a control opening;
    b. at least one vane mounted in said housing and having opposed side portions and movable between a fluid flow permitting position and a position closing the control opening;
    c. resilient means mounted on said housing and connected to said vane for urging same into the position closing the control opening;
    d. means mounted on said housing and connected to said vane for moving same between the flow permitting position and the position closing the control opening and having a fusible portion thereby allowing said resilient means to move said vane into the position closing said control opening in the event of temperature above the melting point of said fusible portion;
    e. means mounted on said vane and said housing for retaining said vane in the position closing the control opening after melting of said fusible portion, said means for retaining said vane in said closing position after melting of said fusible portion including:
        1. a stop member mounted on said housing adjacent said vane;
        2. a fusible link having opposite ends;
        3. a first holder member mounted on said vane and having one end of said fusible link connected thereto; and
        4. a second holder member mounted on said vane and having the other end of said fusible link connected thereto, said second holder member being resilient and retained in a position to clear said stop member during movement of said vane and movable to a position in engagement with said stop member upon melting of said fusible link.

2. A control damper as set forth in claim 1 wherein:
    a. said means for moving said vane between the flow permitting position and the position closing the control opening includes:
        1. a first bracket mounted on said housing; 2. a second bracket mounted on said vane and movable therewith; and
        3. an arm operatively connected to said first bracket and movable relative to same, said arm having said fusible portion connected thereto and extending therefrom and connected to said bracket.

3. A control damper as set forth in claim 2 wherein:

a. said housing has a plurality of vanes mounted therein and including an upper vane and a lower vane;
b. each of said vanes has an axle portion extending therefrom and outwardly through said housing;
c. each of said axle portions has an arm extending therefrom; and
d. a connector link pivotally is connected to each of said arms whereby movement of one of said vanes effects movement of all of said vanes and locking of one of said vanes locks all of said vanes.

4. A control damper as set forth in claim 3 wherein:
a. said second bracket of said means for moving said vanes between the flow permitting position and the position closing the control opening is mounted on the upper vane; and
b. said first holder member and said second holder member of said means for retaining said vanes in the position closing the control opening are mounted on the lower vane.

5. A control damper for a fluid conduit, said control damper comprising:
    a. a housing having side walls defining a control opening;
    b. a plurality of elongated vanes mounted in said housing and including at least a first vane and at least a second vane with connecting mechanism for simultaneous movement, said vanes each having opposed side portions and being movable between a fluid flow permitting position and a position closing the control opening;
    c. a resilient member mounted on said housing and connected to one of said vanes for urging same into the position closing the control opening;
    d. means mounted on said housing and connected to first vane for moving said vanes between the flow permitting position and the position closing the control opening and having a fusible portion thereby allowing said resilient member to move said respective vanes into the position closing the control opening in the event of temperature above the melting point of said fusible portion, said means for moving said vanes between the flow permitting position and the position closing the control opening including:
        1. a pair of laterally spaced first brackets each mounted on a respective one of said side walls of said housing, said first brackets being laterally aligned;
        2. a shaft extending between and rotatably supported on said first brackets;
        3. a second bracket mounted on the upper vane and movable therewith; and
        4. an arm mounted on said shaft and movable therewith relative to said first brackets, said arm having said fusible portion connected thereto and extending therefrom and connected to said second bracket thereby retaining said vanes in a respective selected position;
    e. means mounted on said second vane and on said housing for retaining said vanes in the position closing the control opening after melting of said fusible portion, said means for retaining said vanes in said closing position after melting of said fusible portion including:
        1. a stop member mounted on said housing adjacent the second vane;
        2. a fusible link having opposite ends;

3. a first holder member mounted on said second vane and having the other end of said fusible link connected thereto; and
4. a second holder member mounted on said second vane and having the other end of said fusible link connected thereto, said second holder member being resilient and retained in a position to clear said stop member during movement of said second vane and moveable to a position in engagement with said stop member upon melting of said fusible link.

6. A control damper as set forth in claim 5 wherein:
a. each of said plurality of vanes has axle portions extending from opposite ends thereof and each extending outwardly through a respective one of said side walls of said housing; and
b. said means for retaining said vanes in the position closing said control opening after melting of said fusible portion includes:
   1. a plurality of arms each mounted on and extending outwardly from respective one of said axle portions, said arms each being adjacent a respective one of the side walls of said housing; and
   2. a connector link pivotally connected to each of said arms whereby movement of one of said vanes effects movement of all of said vanes and locking of one of said vanes effects locking of all of said vanes.

7. A control damper for a fluid conduit, said control damper comprising:
a. a housing defining a control opening;
b. at least one vane mounted in said housing and having opposed side portions and movable between a fluid flow permitting position and a position closing the control opening;
c. resilient means operatively connected to said vane for urging same into the position closing the control opening;
d. means mounted on said housing and connected to said vane for moving same between the flow permitting position and the position closing the control opening and having a fusible portion thereby allowing said resilient means to move said vane into the position closing said control opening in the event of temperature above the melting point of said fusible portion;
e. means mounted on said vane and said housing for retaining said vane in the position closing the control opening after melting of said fusible portion, said means for retaining the vane in said closing position including:
   1. a stop member mounted on said housing adjacent said vane;
   2. a holder member mounted on said vane and having an end portion, said holder member being resilient; and
   3. a fusible link having one end fixed relative to said vane and another end connected to said holder member adjacent said end portion for normally retaining said holder member in a position clear of said stop member during movement of the vane and releasing said holder member for movement to a position in engagement with said stop member upon melting of said fusible link.

* * * * *